March 5, 1946.    R. E. MORGAN ET AL    2,395,935
STUFFING BOX PACKING
Filed Sept. 29, 1943

RALPH E. MORGAN
PAUL N. CURRY
INVENTOR

BY
ATTORNEY

Patented Mar. 5, 1946

2,395,935

UNITED STATES PATENT OFFICE 2,395,935

STUFFING BOX PACKING

Ralph E. Morgan and Paul N. Curry, Kalamazoo, Mich., assignors to Durametallic Corporation, Kalamazoo, Mich.

Application September 29, 1943, Serial No. 504,222

5 Claims. (Cl. 288—12)

This invention relates to packing for a stuffing box, or similar equipment, and particularly to the type of packing capable of withstanding the corrosive effects of strong acid.

The principal object of this invention is to provide an anti-frictional and resilient stuffing box packing which will not be destroyed by strong acid.

Another object of this invention is to provide an anti-frictional and resilient packing which will not be destroyed by hydrofluoric acid.

Another object of this invention is to provide an antifrictional packing suitable for use in a stuffing box which will not be destroyed or damaged by contact with strong acid and which will be mechanically strong, durable, and resilient.

Another object of this invention is to provide an anti-frictional packing suitable for use in a stuffing box which will not be destroyed or damaged by contact with strong acid, which will be mechanically strong, durable, and resilient, and which will be capable of economical manufacture.

Another object of this invention is to provide an acid-resistant mechanical packing which can be effectively lubricated, either by external means or by self-contained means.

Another object of this invention is to provide an anti-frictional and resilient packing which is resistant to a wide range of corrosive materials.

Another object of this invention is to provide an anti-frictional and resilient packing which is both resistant to a wide range of corrosive materials and mechanically strong and durable.

Another object of this invention is to provide a packing which is resistant to a wide range of corrosive materials, mechanically strong and durable, capable of either external or self-lubrication, and adaptable to economical manufacture.

Recent developments in industrial processes have brought into being conditions of temperature, pressure, and corrosiveness which were not even suspected a few years ago. These require stronger and more corrosion resistant tanks, pipes, pumps, and similar equipment, and this latter requires that the stuffing boxes of the pumps be supplied with packing which will be soft enough to fit closely around the shafts or rods, resilient enough to follow irregularities in such shafts or rods, hard enough and stiff enough to withstand high pressures, resistant to a wide variety of materials, and yet capable of economical manufacture. In several recent developments, including the manufacture of high-octane gasoline, further progress in the use of certain chemically desirable temperatures, pressures, and catalysts await the development of means for satisfactorily packing or sealing stuffing boxes of the pumps.

So far, no known packing has all of the above-named essential characteristics. Hereinafter, however, there is disclosed a combination of materials and a method of processing which will produce a packing having the above-named desirable characteristics. This packing is particularly applicable to certain perplexing packing problems in the petroleum refining industry. While it is, of course, not offered as the answer to every packing problem in existence, it is solving certain of the presently most serious ones.

The immediate problem giving rise to this invention is the problem of packing hydrofluoric acid. This acid is used in large quantities as a catalyst in the preparation of high-octane aviation gasoline, but destroys with great rapidity the now known packings and thereby causes frequent shutdown for repacking of pumps. These shutdowns, even when directly involving only a few pumps require in most cases the concurrent shutdown of a large section of the refinery. Since the production of a large refinery for even a few minutes is measured in hundreds or thousands of dollars, and its gasoline production for an hour would keep even a large bomber in the air for several hours, it is evident that a packing which will double the length of time between the shutdowns for repacking will be invaluable from both a dollar standpoint and a military standpoint. This the hereinafter-disclosed packing will do.

Figure 1:
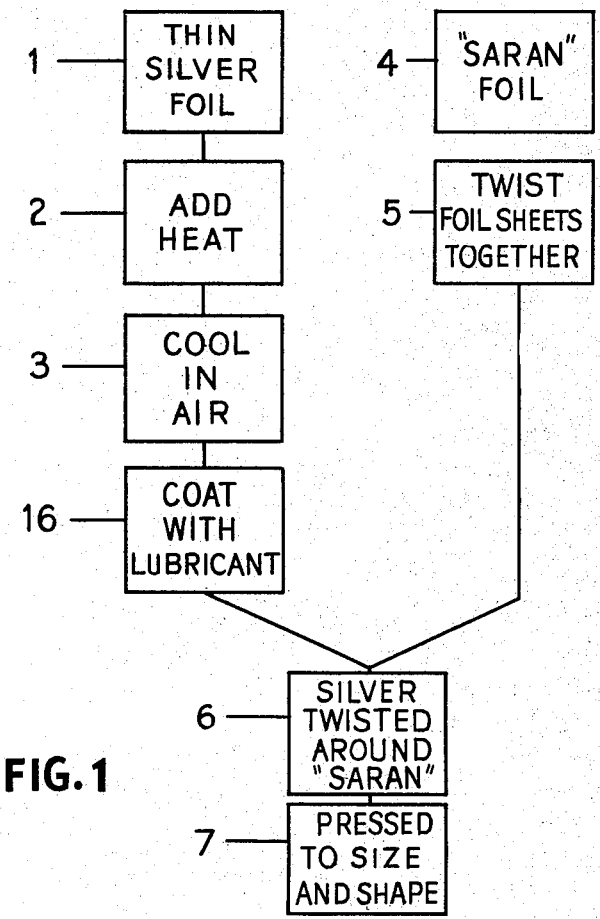
Fig. 1 shows a flow diagram illustrating the method of preparing one form of the packing.

Referring now to the construction of the packing of our invention, it is made by twisting together several strips of a copolymer comprising approximately 85% vinylidene chloride and approximately 15% vinyl chloride to form strands and then wrapping said strands with anti-frictional metal foil.

The copolymer is obtained in long and thin strips of foil, whose exact length or width will depend upon the size of packing it is desired to make. For a finished packing of ⅜ inch square, strips 4 inches wide and 0.001 to 0.002 inch thick will be found quite satisfactory. These strips are twisted together in any of several ways, but we find that twisting the strips in one direction to make the strands and then twisting the strands about each other in the opposite direction gives satisfactory results. This forms a rope-like mass which is then covered by a metallic foil, preferably silver.

The silver foil (for example, 0.001 inch thick and 4 inches wide) is first heated to a dull red heat and then allowed to cool in quiet air back to normal temperature. This anneals it sufficiently to make it soft, pliable, and capable of fitting closely to the copolymer center.

Next the problem of lubrication is dealt with by precipitating a microscopic film of graphite onto the silver foil. This is accomplished by spraying a solution in oleum spirits, or other volatile vehicle, of colloidal graphite onto the metal foil as it passes by a fixed spray gun and then passing the foil through a heat chamber to evaporate the volatile vehicle. This leaves a coating of graphite that covers, on the average, approximately 95% of the surface with a thin and tenacious film. Thus a fine coating of dry lubricant is placed upon the silver and permeates its mass when the silver is twisted around the core. This gives full lubrication to all parts at all likely to move against each other or against a pump shaft.

The annealed and lubricated silver strip is crinkled by any of many known methods, and then wrapped around the copolymer center by any convenient means. We find that it gives highly satisfactory results if the silver foil is twisted somewhat during the wrapping process in a direction opposite to that of the wrapping. In this way the silver foil wraps tightly around the polymer center, will not readily loosen, and provides large number of tiny interstices for the receiving and retaining of lubrication.

The specific copolymer hereinbefore mentioned is an example of the class described as having a softening point above 130° C. and prepared by polymerizing pure monomeric vinylidene chloride with a minor proportion of vinyl chloride, vinyl or other unsaturated esters of carboxylic acids, esters of acrylic or methacrylic acids, or styrene, and the like. In the following description and claims, the term "vinylidene halide polymers" will unless clearly indicated otherwise by the context, refer to any of the above polymers or copolymers.

The copolymer produced is a material which in thick masses is hard and horny and has a high tensile strength. However, because of the latter characteristic, in thin sheets it is very resilient. It is also resistant to corrosion by many acids including hydrofluoric. By twisting it as above described, a core is obtained which will not weaken during proper use. It is, on the other hand, highly frictional and susceptible to heat. The metal foil, therefore, serves to protect the polymer from direct frictional contact with the shaft and also to carry away such heat as is generated by friction between the packing surface and the shaft or rod. Silver is preferred because it will resist corrosion by hydrofluoric acid, has high anti-frictional qualities, and because it can be annealed as above described to a state of softness and pliability which on twisting produces much finer interstices and these provide better sealing qualities.

Obviously, the characteristics of the finished product can be controlled and varied by changing the proportions of component materials.

Increasing the vinylidene copolymer proportion will lower the density or hardness of the packing. While this will enable it to withstand only lessened pressures, it will make it much more resilient and thus enable it to follow a bent or warped shaft (or rod or stem) without losing its seal. On the other hand, increasing the proportion of silver will increase the hardness and density, which will enable the packing to withstand higher operating pressures, but will lower its resiliency and thus limit its use to more perfectly aligned shafts and housings. We have found that a good average is secured for $\frac{3}{8}$ inch square packing by using three strips of polyvinylidene chloride foil 6 inches wide and 0.001 inch thick twisted into a rope-like structure to form a core and three strips of silver foil of the same size twisted and wrapped around the core.

Figure 2:
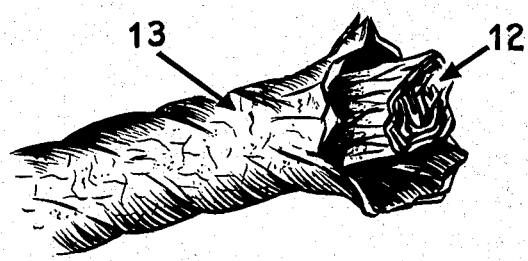
Fig. 2 shows the completed packing with one end spread out to show the construction.
Figure 3:
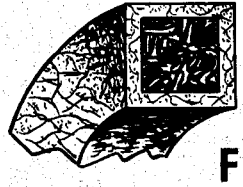
Fig. 3 shows a cross-section through one type of packing.

The structure may then be, and preferably is, subjected to pressure (such as by two pairs of opposed rollers) and formed to a square section for the finished product. Fig. 2 shows the packing after twisting but before going through the rollers. Numeral 12 represents the polymer core and 13 represents the silver covering. Fig. 3 shows the finished packing.

One limitation to the use of this packing is temperature. Since the polymer begins to creep at 170° F., its operating temperature should be kept well below that amount although there will be no harm done if the temperature goes for short periods above that amount.

There are many variations from this particularly disclosed form of the packing which will at once suggest themselves to those persons acquainted with this art, and the form disclosed is by way of example only of a wide field, excepting only to the extent that the claims expressly limit otherwise.

Having thus fully described and illustrated our invention, we claim:

1. A corrosion-resistant packing comprising: a strip of polyvinylidene chloride foil twisted upon itself to form a core, and a strip of silver foil coated with finely divided graphite wrapped around said core.

2. A corrosion-resistant packing comprising: a strip of foil comprising a polyvinylidene chloride plastic having a softening point between 120 degress centigrade and 140 degrees centrigrade and being of the order of 0.001 inch thick twisted upon itself to form a core, a strip of annealed silver foil of the order of 0.001 inch thick uniformly coated with finely divided graphite wrapped around said core.

3. A corrosion-resistant packing comprising: a strip of corrosion-resistant foil comprising a vinylidene chloride copolymer wherein the vinylidene chloride predominates twisted tupon itself to form a core and a strip of silver foil coated with a lubricant wrapped around said core.

4. A corrosion resistant packing comprising: a strip of foil comprising a copolymer of vinylidene chloride twisted upon itself to form a core and a strip of silver foil wrapped around said core.

5. A corrosion resistant packing comprising: a strip of polyvinylidene chloride foil twisted upon itself to form a core and a strip of silver foil coated with a lubricant wrapped around said core.

RALPH E. MORGAN.
PAUL N. CURRY.